Figure 1:
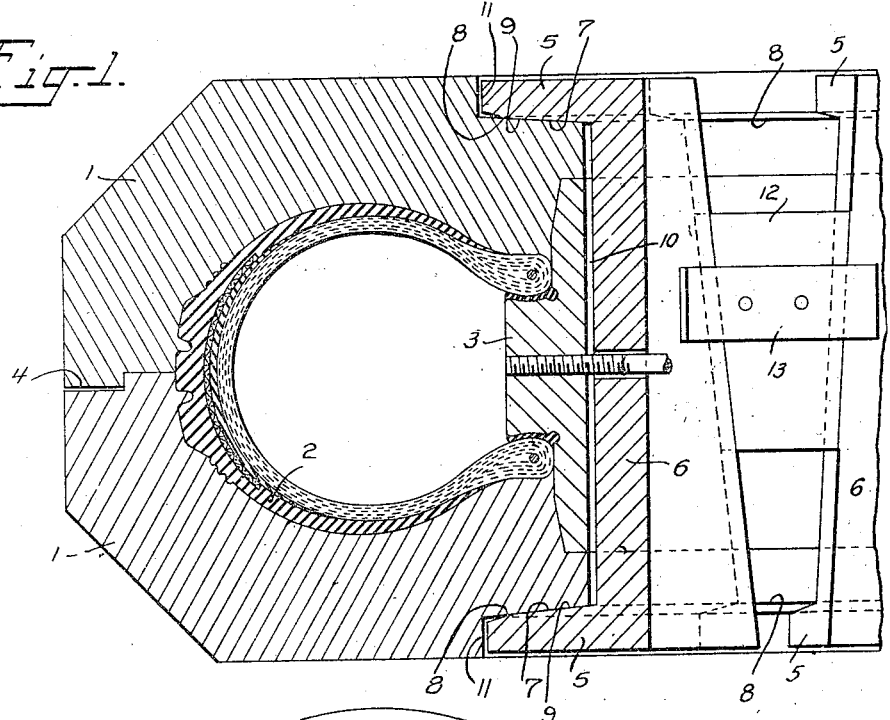

E. HOPKINSON.
MOLD FOR PNEUMATIC TIRES FOR VEHICLES.
APPLICATION FILED JAN. 31, 1918.

1,289,769.

Patented Dec. 31, 1918.

Inventor
Ernest Hopkinson

UNITED STATES PATENT OFFICE.

ERNEST HOPKINSON, OF NEW YORK, N. Y.

MOLD FOR PNEUMATIC TIRES FOR VEHICLES.

1,289,769.                    Specification of Letters Patent.          Patented Dec. 31, 1918.

Application filed January 31, 1918. Serial No. 214,609.

*To all whom it may concern:*

Be it known that I, ERNEST HOPKINSON, a citizen of the United States, residing in New York city, county of New York, and State of New York, have invented certain new and useful Improvements in Molds for Pneumatic Tires for Vehicles, of which the following is a full, clear, and exact description.

This invention relates to molds for use in the manufacture of tires and is directed more particularly to the type of molds used in the manufacture of pneumatic tire casings.

The principal object of the invention is to provide a mold formed in sections that may be readily secured together about the tire by simple devices that may be easily and quickly applied and removed and which make it feasible to use a mold of comparatively simple design and of considerably reduced weight.

Figure 2:
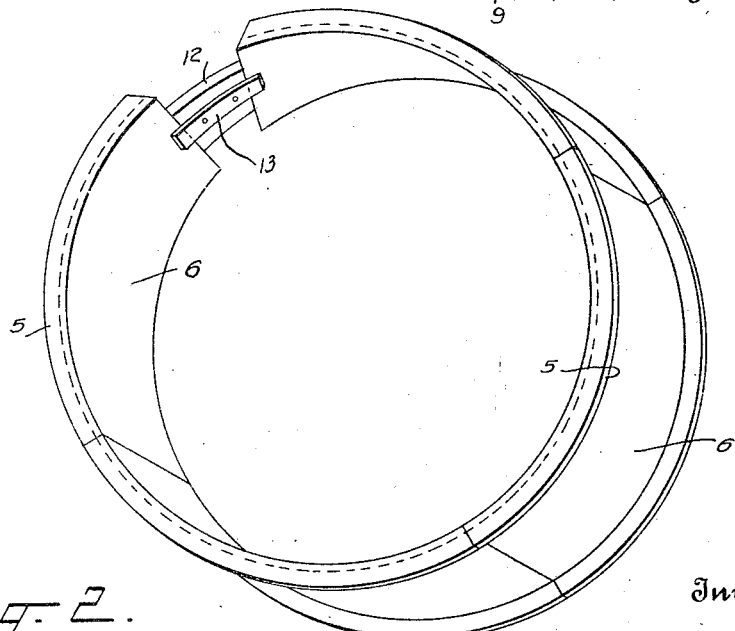

Referring to the drawings forming part of this specification:

Figure 1 is a transverse sectional view of a mold showing the preferred embodiment of my invention with a tire supported therein; and, Fig. 2 is a perspective view of the assembled mold-locking or clamping devices.

In the usual type of tire mold wherein the sections are secured together to enable the mold, while supporting the tire, to be moved about or to be vulcanized independent of any confining pressure, such as is applied by the usual hydraulic ram of the vulcanizing press, it has been the usual practice to provide the sections with oppositely disposed internal and external circumferential flanges or lugs for the reception of numerous bolts which are applied and removed at each vulcanization of a tire in order to assemble and disassemble the mold sections. This represents a tedious and laborious operation as the bolts can only be tightened and loosened by the aid of a powerful wrench which causes the expenditure of much time and labor. Furthermore, the flanges or lugs must be comparatively large to afford the required strength of material and thereby add much to the weight and complexity of the mold sections. My invention is directed toward eliminating all these fastening means and substituting therefor a very simple clamping device which may be readily applied and which will permit of considerable reduction in weight of the mold.

In the present embodiment, I have shown a mold especially adapted for use in building a tire, according to my method as set forth in my co-pending application Serial No. 212,517, but it is not intended that my invention be in any way limited to any particular method of building the casing for it may be used with tires built upon a core or otherwise in any manner desired.

The mold in my preferred embodiment comprises the members 1—1 which when assembled form a cavity which defines the size of the tire to be molded which, in the present instance, is represented by the tire casing 2 which is mounted upon a supporting rim 3, but as before remarked, it is in no way limited to this type of support. The sections are similar in the main to the usual mold sections, with the exception that they may be made materially lighter. They are provided along their contacting faces with the usual complementary flange and groove connection 4 for insuring accurate registering of the two members.

My invention being mainly directed to simplicity and efficiency of structure, the clamp in its simplest form is in cross-section of the general outline of a channel iron as clearly shown in Fig. 1 and comprises the flanges or jaws 5—5 and connecting web 6. This forms a clamp which spans the mold members in a manner to cause the flanges or jaws to clamp the two members together at oppositely disposed points. The flanges 5 and web 6 are preferably made as an integral structure and present substantial rigidity and strength to serve the intended purpose of holding the mold sections together.

It is obvious that any desired number of these clamps may be used and that they may be applied either from the inner or outer circumference of the mold as desired. In either event, the flanges will constitute a gripping jaw that will grip the mold members over a considerable area and extend well toward the center of the inner cavity to be in alinement with a considerable portion of the mold cavity in order to resist most efficiently the internal pressure produced during the vulcanizing treatment.

In the preferred embodiment of my invention, I have shown the clamps applied from the inner circumference of the molds and arcuate in shape to partake of the curvature of the inner circumference. The flanges have their engaging faces 7 slightly tapering outwardly, and grooves 8 are formed in the outer surfaces of the mold sections having corresponding tapering surfaces 9 to receive the tapering faces of the mold members. The clamps are best applied while the mold members are being subjected to pressure as from a hydraulic press. The clamps can then be easily slipped in place and to insure the desired engagement of the contacting surfaces 7 and 9, it is desirable to provide the clearance spaces 10 and 11 between the web 6 and the mold sections, and outer edges of the flanges 5 and grooves 8.

In one embodiment of my invention the clamps are made in sections which may, for instance, be four in number as shown in Fig. 2. These may, for simplicity of manufacture, be cut from a cylindrical drum having a suitable cross-section, in a manner to leave a small section 12 which may be cut wedge-shaped from the cylinder and with the edge also cut on a bevel, in which instance the flanges and a portion of the web at the smaller end are cut away and the curved bar 13 secured to the inner face as shown in Fig. 2. This bar coöperates with the beveled faces of the wedge-shaped member to securely maintain it in accurate alinement with the adjacent sections or clamps. The sectional clamps thus form a cylindrical shell having a wedge-shaped opening which is engaged by the wedge-shaped locking member 12 to prevent the sections becoming loose or falling out of place if the pressure of the mold sections is released for any reason. I prefer to cut the sections from the cylindrical shell through radial cutting planes, thereby giving converging edges to the flanges of the sections which will operate in an obvious manner to further secure them together when the lock 12 is placed in position.

As many apparently widely different embodiments of this invention may be made without departing from the spirit thereof, it is to be understood that I do not intend to limit myself to the specific form of the invention as set forth except as indicated in the appended claims.

What I claim and desire to secure by Letters Patent of the United States is:—

1. A mold for vulcanizing tire casings comprising outer mold members coöperating to form a cavity for the tire, clamps independent of said cavity holding said members together, and means independent of and separable from the mold members for maintaining said clamps in position.

2. A mold for vulcanizing tire casings comprising outer mold members coöperating to form a cavity for the tire, clamps independent of said cavity engaging the inner edges of the mold members to hold them together, and means independent of and separable from the mold members for maintaining said clamps in position.

3. A mold for vulcanizing tire casings comprising outer mold members coöperating to form a cavity for the tire, arc-shaped clamps independent of said cavity engaging the inner edges of the mold members to hold them together, and means for maintaining said clamps in position.

4. In a mold for vulcanizing tire casings the combination of outer mold members coöperating to form a cavity for the tire and clamps independent of said cavity formed of arc-shaped webs having integral projecting flanges with oppositely disposed inner faces for engaging oppositely disposed corresponding faces of the said members.

5. In a mold for vulcanizing tire casings the combination of outer mold members coöperating to form a cavity for the tire and clamps independent of said cavity formed of webs having integral projecting flanges with oppositely disposed beveled inner faces for engaging oppositely disposed correspondingly beveled faces on the said members.

6. In a mold for vulcanizing tire casings the combination of outer mold members coöperating to form a cavity for the tire and clamps independent of said cavity formed of webs having integral projecting flanges with oppositely disposed beveled inner faces for engaging oppositely disposed correspondingly beveled faces on the said members, said clamps in their locking positions, providing a space between the said web and members.

7. In a mold for vulcanizing tire casings the combination of outer mold members coöperating to form a cavity for the tire provided with complementary engaging parts for preventing relative lateral movement of the members, and inextensible rigid clamps independent of said cavity having oppositely disposed flaring faces providing an unobstructed space therebetween adapting said faces to engage by sliding movement corresponding oppositely disposed flaring faces on the members for holding the members together.

8. In a mold for vulcanizing tire casings the combination of outer mold members coöperating to form a cavity for the tire and clamps independent of said cavity formed of arc-shaped webs having integral projecting flanges, said members being provided with grooves for receiving the said flanges.

9. A mold for vulcanizing tire casings comprising outer mold members coöperating to form a cavity for the tire, arc-shaped clamps independent of said cavity for holding said members together forming an open cylindrical shell, and a locking member in the opening for securing the sections against displacement when in clamping positions.

10. A mold for vulcanizing tire casings comprising outer mold members coöperating to form a cavity for the tire, arc-shaped sectional clamps independent of said cavity for holding said members together forming an open cylindrical shell the contacting edges of the sections being in radial planes, and a locking member in the opening for securing the sections against displacement when in clamping positions.

11. A mold for vulcanizing tire casings comprising outer mold members coöperating to form a cavity for the tire, arc-shaped sectional clamps independent of said cavity for holding said members together forming a cylindrical shell with a wedge-shaped opening, and a wedge-shaped locking member engaging the walls of said opening for securing the sections against displacement when in clamping positions.

12. A mold for vulcanizing tire casings comprising an inner support for the tire having a portion extending outwardly beyond the edges of the tire, outer mold members engaging the extended portion of the inner support about oppositely disposed faces to render said support immovable relative to the said members and tire edges throughout the entire functioning of the parts, and a plurality of independent clamps for holding said members together to render said mold individually portable.

13. In a mold for vulcanizing tire casings the combination of outer mold members providing a tire receiving cavity therebetween and clamps independent of said cavity formed of webs having integral projecting flanges with oppositely disposed inner faces for engaging oppositely disposed corresponding faces of the said members in alinement with a considerable portion of said mold cavity.

Signed at New York city, New York, this 30th day of January, 1918.

ERNEST HOPKINSON.